April 25, 1939.     H. P. MURPHY     2,156,222
COUNTERELECTROMOTIVE-FORCE CELL
Filed Feb. 23, 1937
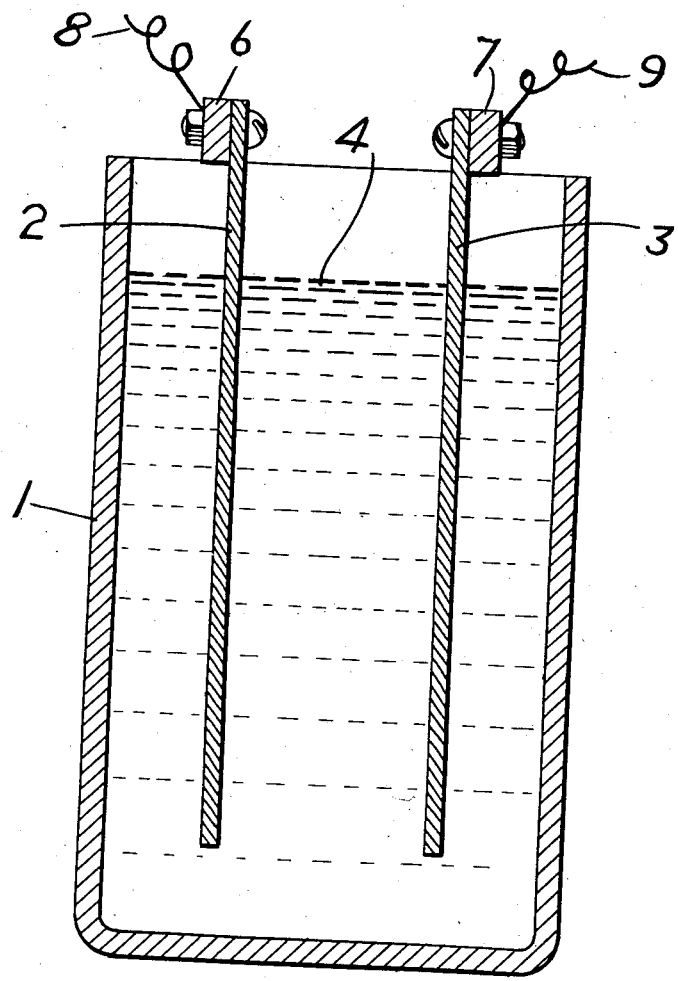
WITNESS:
INVENTOR
Harold P. Murphy
BY
Augustus B Stoughton
ATTORNEY.

Patented Apr. 25, 1939

2,156,222

UNITED STATES PATENT OFFICE 2,156,222

COUNTERELECTROMOTIVE-FORCE CELL

Harold P. Murphy, Ridley Park, Pa., assignor to The Electric Storage Battery Company, Philadelphia, Pa., a corporation of New Jersey Application February 23, 1937, Serial No. 127,010

12 Claims. (Cl. 175—315)

It is an object of my invention to provide an improvement in the electrolyte for the electrolytic counter-electromotive-force cell described in U. S. Patent No. 1,902,081 to Kershaw & Woodbridge. The electrolyte disclosed in the patent mentioned consists of a solution of sodium or potassium hydroxide to which may be added a small amount of sodium or potassium chromate or bichromate.

The improvement consists in the addition of a small quantity of a compound of iron, preferably iron sulphate, and a small quantity of an organic compound capable of preventing or retarding the precipitation of the iron, such as tartaric acid.

Other objects of my invention will be apparent from the annexed specification at the end whereof the novel features of my invention will be specifically pointed out and claimed.

In the drawing, the single figure is a vertical cross-section through a counter-electromotive-force cell.

In that embodiment of my invention chosen from among others for illustration in the drawing and description in the specification, my invention is shown as consisting of a container 1, in which are mounted electrodes 2, 3 which may be of metallic nickel or suitable nickel alloy such as nichrome. Other metal or alloy may be used for the electrodes provided it is of such a nature that it will not combine with or be attacked by the electrolyte when current is passing through the cell. If current is to pass through a cell, always in the same direction, only the positive electrode needs be resistant to the electrolytic action. The negative electrodes may be of some other material such as iron, which would not be satisfactory for positive electrodes. The electrodes 2 and 3 are provided with connections 6 and 7 for the attachment of the circuit wires 8 and 9. The electrolyte is shown within the cell 1 at 4.

The iron and tartaric acid may be added to the electrolyte disclosed in the above-mentioned patent including the potassium bichromate or preferably the bichromate may be omitted, the electrolyte then consisting of sodium hydroxide to which is added a small amount of ferrous sulphate and a small amount of tartaric acid. As an example of this electrolyte, the following proportions may be used, these being by weight:

| | Parts |
|---|---|
| Water | 100 |
| NaOH—sodium hydroxide | 10.00 |
| $FeSO_4 \cdot 7H_2O$—ferrous sulphate | 0.010 |
| Tartaric acid | 0.015 |

While it is preferable, after mixing this solution, to introduce it into the cell and pass current through the cell quite promptly, I find that the solution thus prepared may be kept for a period of several weeks without precipitating the greater part of the iron so that the beneficial effect of the iron will be realized.

The effect of the addition of the iron appears to be a deposit of iron on the cathode and possibly of iron hydroxide on the anode when current is passed through the cell. The result of this deposition of iron is to maintain a more nearly constant voltage across the terminals of the cell in service as compared with the gradual rise of voltage which sometimes occurs after the cells have been in service for some little time. This rise of voltage appears to be due to the deposition of small quantities of impurities from the water used in filling the cells from time to time to replace the loss due to electrolysis, and the deposition of iron on the plates appears to prevent or retard this deposition of impurities. The iron introduced into the electrolyte also retards electrolytic corrosion of the plates and prolongs their life.

Ordinarily, iron is precipitated out of a solution of potassium or sodium hydroxide more or less completely in the course of a short time. However, the beneficial results may be attained to a certain degree if current is passed through the cell immediately after the solution of the soluble salt of iron has been added.

In order to avoid the prompt precipitation of the iron, I have found it advantageous to add to the solution a small quantity of an organic compound capable of preventing or retarding this precipitation. A number of organic compounds are known to have this characteristic, among them being tartaric acid, citric acid and cane sugar. I have found that tartaric acid gives very satisfactory results for this purpose.

It will be understood by anyone familiar with the accepted theory of ordinary chemical reactions in electrolytic solutions that the addition of a soluble salt of iron such as ferrous sulphate to an aqueous solution introduces free ions of iron into the solution and that it is these free iron ions that enter into the chemical reactions which ensue.

I do not intend to be limited save as the scope of the prior art and of the attached claims may require.

I claim:

1. In an electrolytic cell of a special type having electrodes of the iron group and electrolyte of the alkali hydroxide group and adapted for use in electric circuits carrying direct currents, an electrolyte consisting of a solution of water, sodium hydroxide, ferrous sulphate, and tartaric acid.

2. In an electrolytic cell of a special type having electrodes of the iron group and electrolyte of the alkali hydroxide group and adapted for use in electric circuits carrying direct currents, an electrolyte consisting of the following materials in the following proportions by weight: water, 100 parts; hydroxide of an alkali metal, 10 parts; a soluble compound of iron with an acid radical harmless with respect to the electrodes, 0.01 parts; and an organic compound selected from the class consisting of tartaric acid, citric acid, and cane sugar and capable of retarding the precipitation of the iron, 0.015 part.

3. In a counter-electromotive-force cell having an anode and a cathode of the iron group and adapted for use in electric circuits carrying direct current, an electrolyte of the alkali hydroxide group containing a small amount of a soluble compound of iron with an acid radical harmless with respect to the electrodes and which causes a deposit of iron on the cathode when current is passed through the cell, and a small amount of an organic compound capable of preventing or retarding the precipitation of the iron out of the electrolyte as a deposite in the bottom of the cell.

4. A counter-electromotive-force cell adapted for use with direct current having an electrode of metallic nickel devoid of active material and an electrolyte consisting of a solution of the hydroxide of an alkali metal and a comparatively small amount of a soluble compound of iron with an acid radical harmless with respect to the electrodes and an organic compound capable of retarding the precipitation of the iron and selected from the class consisting of tartaric acid, citric acid and cane sugar.

5. A counter-electromotive-force cell having an electrode of metallic nickel devoid of active material and an electrolyte consisting of a solution of the hydroxide of an alkali metal and a soluble chromate of an alkali radical and a comparatively small amount of a soluble compound of iron with an acid radical harmless with respect to the electrodes and an organic compound capable of retarding the precipitation of the iron and selected from the class consisting of tartaric acid, citric acid and cane sugar.

6. A counter-electromotive-force cell adapted for use with direct current having metallic electrodes containing nickel and devoid of active material and an electrolyte consisting of a solution of the hydroxide of an alkali metal and a comparatively small amount of a soluble compound of iron with an acid radical harmless with respect to the electrodes and an organic compound capable of retarding the precipitation of the iron and selected from the class consisting of tartaric acid, citric acid and cane sugar.

7. In an electrolytic cell having electrodes of the iron group and electrolyte of the alkali hydroxide group and adapted for use in electric circuits carrying direct currents, said electrolyte containing a comparatively small amount of a soluble compound of iron with an acid radical harmless with respect to the electrodes and which operates in the same way as the sulphate and an organic compound capable of retarding the precipitation of the iron and selected from the class consisting of tartaric acid, citric acid and cane sugar.

8. In an electrolytic cell having electrodes of the iron group and electrolyte of the alkali hydroxide group and adapted for use in electric circuits carying direct currents, said electrolyte containing a comparatively small amount of iron sulphate and an organic compound capable of retarding the precipitation of the iron and selected from the class consisting of tartaric acid, citric acid and cane sugar.

9. In an electrolytic cell having electrodes of the iron group and electrolyte of the alkali hydroxide group and adapted for use in electric circuits carrying direct currents, said electrolyte containing a comparatively small amount of a soluble compound of iron with an acid radical harmless with respect to the electrodes and tartaric acid capable of retarding the precipitation of the iron.

10. In an electrolytic cell having electrodes of substantially pure metallic nickel with an electrolyte of the alkali hydroxide group and adapted for use in electric circuits carrying direct currents, said electrolyte containing a comparatively small quantity of iron ions.

11. In an electrolytic cell having electrodes of the iron group with an electrolyte of the alkali hydroxide group and adapted for use in electric circuits carying direct currents, said electrolyte containing a comparatively small quantity of iron ions and an organic compound capable of retarding the precipitation of the iron and selected from the class consisting of tartaric acid, citric acid and cane sugar.

12. The process of treating an electrolytic cell having electrodes of the iron group and an electrolyte of the alkali hydroxide group and adapted for use in electric circuits carrying direct currents which consists in introducing iron ions into the electrolyte and passing direct current through the cell before precipitation of the iron.

HAROLD P. MURPHY.